United States Patent
Link (10) Patent No.: US 12,420,797 B2
(45) Date of Patent: Sep. 23, 2025

(54) SYSTEM AND METHODS FOR SHIFT CHARACTERIZATION BY DRIVER INTERVENTION AND EXTERNAL ENVIRONMENT

(71) Applicants: Hyundai Motor Company, Seoul (KR); Kia Corporation, Seoul (KR)

(72) Inventor: Brian Link, Superior Township, MI (US)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 103 days.

(21) Appl. No.: 18/454,856

(22) Filed: Aug. 24, 2023

(65) Prior Publication Data

US 2025/0065878 A1    Feb. 27, 2025

(51) Int. Cl.
*B60W 30/00* (2006.01)
*B60W 30/18* (2012.01)
*B60W 50/10* (2012.01)

(52) U.S. Cl.
CPC ...... *B60W 30/18163* (2013.01); *B60W 50/10* (2013.01); *B60W 2420/403* (2013.01); *B60W 2540/10* (2013.01); *B60W 2540/18* (2013.01); *B60W 2554/80* (2020.02)

(58) Field of Classification Search
CPC .......... B60W 30/18163; B60W 50/10; B60W 2420/403; B60W 2540/10; B60W 2540/18; B60W 2554/80
See application file for complete search history.

(56) References Cited

U.S. PATENT DOCUMENTS

| | | | |
|---|---|---|---|
| 6,353,788 B1* | 3/2002 | Baker | G08G 1/166 340/436 |
| 9,477,236 B2* | 10/2016 | Colvin | G05D 16/2066 |
| 2017/0248957 A1* | 8/2017 | Delp | B60W 10/20 |
| 2019/0016339 A1* | 1/2019 | Ishioka | B60W 30/0956 |
| 2019/0382020 A1* | 12/2019 | Niibo | B60W 30/18163 |
| 2022/0219701 A1* | 7/2022 | Chikamori | B60W 30/182 |
| 2022/0297727 A1* | 9/2022 | Imanishi | B60W 50/10 |

FOREIGN PATENT DOCUMENTS

| | | | |
|---|---|---|---|
| JP | 2006-071005 A | | 3/2006 |
| WO | 2008/132591 A2 | | 11/2008 |

* cited by examiner

*Primary Examiner* — Phutthiwat Wongwian
*Assistant Examiner* — Sherman D Manley
(74) *Attorney, Agent, or Firm* — Fox Rothschild LLP (57) ABSTRACT

Systems and methods for performing shift characterization are provided. The method may comprise determining whether an ego vehicle is decelerating based on one or more vehicle control and motion status measurements, monitoring, using a sensor unit, driver input and one or more driving situations for the ego vehicle, when the ego vehicle is decelerating, determining, using a processor and based on the driver input and the one or more driving situations for the ego vehicle from the sensor unit, whether the ego vehicle is entering into a passing maneuver, and, when it is determined that the ego vehicle is entering into the passing maneuver, performing a shift control modification of the ego vehicle.

18 Claims, 7 Drawing Sheets

SYSTEM AND METHODS FOR SHIFT CHARACTERIZATION BY DRIVER INTERVENTION AND EXTERNAL ENVIRONMENT

BACKGROUND

Technical Field

Embodiments of the present disclosure relate to systems and methods for performing shift characterization based on monitoring external sensory inputs and driving conditions to influence various shift control parameters to optimize passing situations.

Background

Various adaptable shift control strategies are currently in the market which seek to alter shift pattern (drivability), but not necessarily shift characterization. These adaptable control features generally rely on a driver index based on driving behavior to calculate driver mildness or aggression and to place the vehicle into a more appropriate drive mode based on the driver's long term driving habits. Deviation in driving behavior can affect short term drive mode selection, but the primary purpose of this is to provide drivability improvements (i.e., aggressive accelerator input during a passing maneuver may put the car in Sport mode).

Shift characterization is dependent on the selected drive mode and cannot be independently modified based on the near-term driving situation. Some methods incorporate altering shift parameters such as gear ratio based on length or duration of driver input into some device (gear shifter, etc.). However, this would potentially result in different shift parameters every time a driver activates an input device.

SUMMARY

According to an object of the present disclosure, a method for performing shift characterization is provided. The method may comprise determining whether an ego vehicle is decelerating based on one or more vehicle control and motion status measurements, monitoring, using a sensor unit, driver input and one or more driving situations for the ego vehicle, when the ego vehicle is decelerating, determining, using a processor and based on the driver input and the one or more driving situations for the ego vehicle from the sensor unit, whether the ego vehicle is entering into a passing maneuver, and, when it is determined that the ego vehicle is entering into the passing maneuver, performing a shift control modification of the ego vehicle.

According to an exemplary embodiment, the one or more vehicle control and motion status measurements may comprise one or more of an accelerator pedal position, vehicle acceleration, and vehicle speed.

According to an exemplary embodiment, the one or more driving situations may comprise one or more of the following: a distance between the ego vehicle and a preceding vehicle; a relative speed between the ego vehicle and the preceding vehicle; and a position of one or more lanes in relation to the ego vehicle.

According to an exemplary embodiment, the determining whether the ego vehicle is decelerating may comprise determining whether an accelerator pedal position of the ego vehicle is less than or equal to a maximum accelerator pedal position. When the accelerator pedal position is not less than or equal to the maximum accelerator pedal position, it may determined that the ego vehicle is not decelerating.

According to an exemplary embodiment, the determining whether the ego vehicle is decelerating may comprise determining whether an acceleration of the ego vehicle is less than or equal to a maximum acceleration. When the acceleration of the ego vehicle is not less than or equal to the maximum acceleration, it may be determined that the ego vehicle is not decelerating;

According to an exemplary embodiment, the determining whether the ego vehicle is decelerating may comprise determining whether a vehicle speed of the ego vehicle is greater than or equal to a minimum vehicle speed. When the vehicle speed of the ego vehicle is not greater than or equal to the minimum vehicle speed, it may be determined that the ego vehicle is not decelerating.

According to an exemplary embodiment, the determining whether the ego vehicle is entering into the passing maneuver may comprise determining one or more driving situations. The one or more driving situations may comprise one or more of the following: a steering angle of the ego vehicle; a turn signal indication of the ego vehicle; and a relative velocity between the ego vehicle and a preceding vehicle.

According to an exemplary embodiment, the determining whether the ego vehicle is entering into the passing maneuver may comprise determining whether a preceding vehicle is present. When the preceding vehicle is not present, it may be determined that the ego vehicle is not entering into the passing maneuver.

According to an exemplary embodiment, the determining whether the ego vehicle is entering into the passing maneuver may comprise, when the preceding vehicle is present, determining whether a relative velocity between the ego vehicle and the preceding vehicle is greater than or equal to a minimum relative velocity between the ego vehicle and the preceding vehicle. When the relative velocity between the ego vehicle and the preceding vehicle is not greater than or equal to the minimum relative velocity between the ego vehicle and the preceding vehicle, it may be determined that the ego vehicle is not entering into the passing maneuver.

According to an exemplary embodiment, the determining whether the ego vehicle is entering into the passing maneuver may comprise, when the preceding vehicle is present, determining whether a right or left turn signal has an on value and, when the right or left turn signal does not have an on value, determining whether an input steering angle turn rate of the ego vehicle is greater than or equal to a steering angle turn rate for a time duration greater than or equal to a time duration for a steering rate check. When the input steering angle turn rate of the ego vehicle is not greater than or equal to a steering angle turn rate for a time duration greater than or equal to a time duration for a steering rate check, it may be determined that the ego vehicle is not entering into the passing maneuver.

According to an exemplary embodiment, the determining whether the ego vehicle is entering into the passing maneuver may comprise, when the preceding vehicle is present, determining whether a right or left turn signal has an on value and, when the right or left turn signal does not have an on value, determining whether a camera of the sensor unit detects that the ego vehicle is changing lanes. When the camera of the sensor unit does not detect that the ego vehicle is changing lanes, it may be determined that the ego vehicle is not entering into the passing maneuver.

According to an exemplary embodiment, the performing the shift control modification of the ego vehicle may comprise performing a hydraulic prefill of a shifting element of the ego vehicle.

According to an exemplary embodiment, the performing the shift control modification of the ego vehicle may comprise determining whether a time since the hydraulic prefill was initiated is less than or equal to a maximum duration of the hydraulic prefill and, when the time since the hydraulic prefill was initiated is not less than or equal to the maximum duration of the hydraulic prefill, cancelling the hydraulic prefill. When the time since the hydraulic prefill was initiated is not less than or equal to the maximum duration of the hydraulic prefill, it may be determined that a driver of the ego vehicle does not command a target shift of the ego vehicle, and it may be determined that the ego vehicle is not entering into the passing maneuver.

According to an object of the present disclosure, a system for performing shift characterization is provided. The system may comprise an ego vehicle. The ego vehicle may comprise a sensor unit configured to monitor driver input and one or more driving situations for the ego vehicle, and a computing device comprising a processor and a memory. The processor may be configured to determine whether an ego vehicle is decelerating based on one or more vehicle control and motion status measurements, when the ego vehicle is decelerating, determine, based on the driver input and the one or more driving situations for the ego vehicle from the sensor unit, whether the ego vehicle is entering into a passing maneuver, and, when it is determined that the ego vehicle is entering into the passing maneuver, perform a shift control modification of the ego vehicle.

According to an exemplary embodiment, the one or more vehicle control and motion status measurements may comprise one or more of the following: an accelerator pedal position; vehicle acceleration; and vehicle speed.

According to an exemplary embodiment, the one or more driving situations may comprise one or more of the following: a distance between the ego vehicle and a preceding vehicle; a relative speed between the ego vehicle and the preceding vehicle; and a position of one or more lanes in relation to the ego vehicle.

According to an exemplary embodiment, the processor, in determining whether the ego vehicle is decelerating, may be configured to determine whether an accelerator pedal position of the ego vehicle is less than or equal to a maximum accelerator pedal position. When the accelerator pedal position is not less than or equal to the maximum accelerator pedal position, it may be determined that the ego vehicle is not decelerating.

According to an exemplary embodiment, the processor, in determining whether the ego vehicle is decelerating, may be configured to determine whether an acceleration of the ego vehicle is less than or equal to a maximum acceleration. When the acceleration of the ego vehicle is not less than or equal to the maximum acceleration, it may be determined that the ego vehicle is not decelerating.

According to an exemplary embodiment, the processor, in determining whether the ego vehicle is decelerating, may be configured to determine whether a vehicle speed of the ego vehicle is greater than or equal to a minimum vehicle speed. When the vehicle speed of the ego vehicle is not greater than or equal to the minimum vehicle speed, it may be determined that the ego vehicle is not decelerating.

According to an exemplary embodiment, the sensor unit may comprise at least one of the following: one or more cameras; and one or more radar sensors.

According to an exemplary embodiment, the processor, in determining whether the ego vehicle is entering into the passing maneuver, may be configured to determine one or more driving situations. The one or more driving situations may comprise one or more of the following: a steering angle of the ego vehicle; a turn signal indication of the ego vehicle; and a relative velocity between the ego vehicle and a preceding vehicle.

According to an exemplary embodiment, the processor, in determining whether the ego vehicle is entering into the passing maneuver, may be configured to determine whether a preceding vehicle is present. When the preceding vehicle is not present, it may be determined that the ego vehicle is not entering into the passing maneuver.

According to an exemplary embodiment, the processor, in determining whether the ego vehicle is entering into the passing maneuver, may be configured to, when the preceding vehicle is present, determine whether a relative velocity between the ego vehicle and the preceding vehicle is greater than or equal to a minimum relative velocity between the ego vehicle and the preceding vehicle. When the relative velocity between the ego vehicle and the preceding vehicle is not greater than or equal to the minimum relative velocity between the ego vehicle and the preceding vehicle, it may be determined that the ego vehicle is not entering into the passing maneuver.

According to an exemplary embodiment, the processor, in determining whether the ego vehicle is entering into the passing maneuver, may be configured to, when the preceding vehicle is present, determine whether a relative velocity between the ego vehicle and the preceding vehicle is greater than or equal to a minimum relative velocity between the ego vehicle and the preceding vehicle. When the relative velocity between the ego vehicle and the preceding vehicle is not greater than or equal to the minimum relative velocity between the ego vehicle and the preceding vehicle, it may be determined that the ego vehicle is not entering into the passing maneuver.

According to an exemplary embodiment, the processor, in determining whether the ego vehicle is entering into the passing maneuver, may be configured to, when the preceding vehicle is present, determine whether a right or left turn signal has an on value.

According to an exemplary embodiment, the processor, in determining whether the ego vehicle is entering into the passing maneuver, may be configured to, when the right or left turn signal does not have an on value, determine whether an input steering angle turn rate of the ego vehicle is greater than or equal to a steering angle turn rate for a time duration greater than or equal to a time duration for a steering rate check. When the input steering angle turn rate of the ego vehicle is not greater than or equal to a steering angle turn rate for a time duration greater than or equal to a time duration for a steering rate check, it may be determined that the ego vehicle is not entering into the passing maneuver.

According to an exemplary embodiment, the processor, in determining whether the ego vehicle is entering into the passing maneuver, may be configured to, when the right or left turn signal does not have an on value, determine whether a camera of the sensor unit detects that the ego vehicle is changing lanes. When the camera of the sensor unit does not detect that the ego vehicle is changing lanes, it may be determined that the ego vehicle is not entering into the passing maneuver.

According to an exemplary embodiment, the processor, in performing the shift control modification of the ego vehicle, may be configured to perform a hydraulic prefill of a shifting element of the ego vehicle.

According to an exemplary embodiment, the processor, in performing the shift control modification of the ego vehicle, may be configured to determine whether a time since the hydraulic prefill was initiated is less than or equal to a maximum duration of the hydraulic prefill.

According to an exemplary embodiment, the processor, in performing the shift control modification of the ego vehicle, may be configured to, when the time since the hydraulic prefill was initiated is not less than or equal to the maximum duration of the hydraulic prefill, cancel the hydraulic prefill. When the time since the hydraulic prefill was initiated is not less than or equal to the maximum duration of the hydraulic prefill, it may be determined that a driver of the ego vehicle does not command a target shift of the ego vehicle, and it may be determined that the ego vehicle is not entering into the passing maneuver.

BRIEF DESCRIPTION OF THE DRAWINGS

The accompanying drawings, which are incorporated in and form a part of the Description of Embodiments, illustrate various non-limiting and non-exhaustive embodiments of the subject matter and, together with the Detailed Description, serve to explain principles of the subject matter discussed below. Unless specifically noted, the drawings referred to in this Brief Description of Drawings should be understood as not being drawn to scale and like reference numerals refer to like parts throughout the various figures unless otherwise specified.

DETAILED DESCRIPTION

The following Description of Embodiments is merely provided by way of example and not of limitation. Furthermore, there is no intention to be bound by any expressed or implied theory presented in the preceding background or in the following Detailed Description.

Reference will now be made in detail to various exemplary embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications, and equivalents, which may be included within the spirit and scope the various embodiments as defined by the appended claims. Furthermore, in this Detailed Description, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Some portions of the detailed descriptions which follow are presented in terms of procedures, logic blocks, processing, and other symbolic representations of operations on data within an electrical device. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities may take the form of electrical or magnetic signals capable of being stored, transferred, combined, compared, and otherwise manipulated in an electronic system, device, and/or component.

It should be borne in mind, however, that these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "determining," "communicating," "taking," "comparing," "monitoring," "calibrating," "estimating," "initiating," "providing," "receiving," "controlling," "transmitting," "isolating," "generating," "aligning," "synchronizing," "identifying," "maintaining," "displaying," "switching," or the like, refer to the actions and processes of an electronic item such as: a processor, a sensor processing unit (SPU), a processor of a sensor processing unit, an application processor of an electronic device/system, or the like, or a combination thereof. The item manipulates and transforms data represented as physical (electronic and/or magnetic) quantities within the registers and memories into other data similarly represented as physical quantities within memories or registers or other such information storage, transmission, processing, or display components.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, logic, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example device vibration sensing system and/or electronic device described herein may include components other than those shown, including well-known components.

Various techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

Various embodiments described herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), a programmable logic controller (PLC), a complex programmable logic device (CPLD), a discrete gate or transistor logic, discrete hardware components, or any combination thereof designed to perform the functions described herein, or other equivalent integrated or discrete logic circuitry. The term "processor," as used herein may refer to any of the foregoing structures or any other structure suitable for implementation of the techniques described herein. As employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Moreover, processors can exploit nano-scale architectures such as, but not limited to, molecular and quantum-dot based transistors, switches and gates, in order to optimize space usage or enhance performance of user equipment. A processor may also be implemented as a combination of computing processing units.

In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration. One or more components of an SPU or electronic device described herein may be embodied in the form of one or more of a "chip," a "package," an Integrated Circuit (IC).

Shift characterization, usually defined as shift feel, timing, and speed, is generally preselected by a driver through a drive mode selection (e.g., Normal drive mode, Sport drive mode, etc.).

Embodiments of the present disclosure pertain to systems and methods for shift characterization based on monitoring external sensory inputs and driving conditions to influence various shift control parameters to optimize passing situations. This improves matching the shift characterization to the present driving situation (such as, e.g., a passing maneuver) or driver intention without the driver needing to select a different drive mode.

Figure 1:
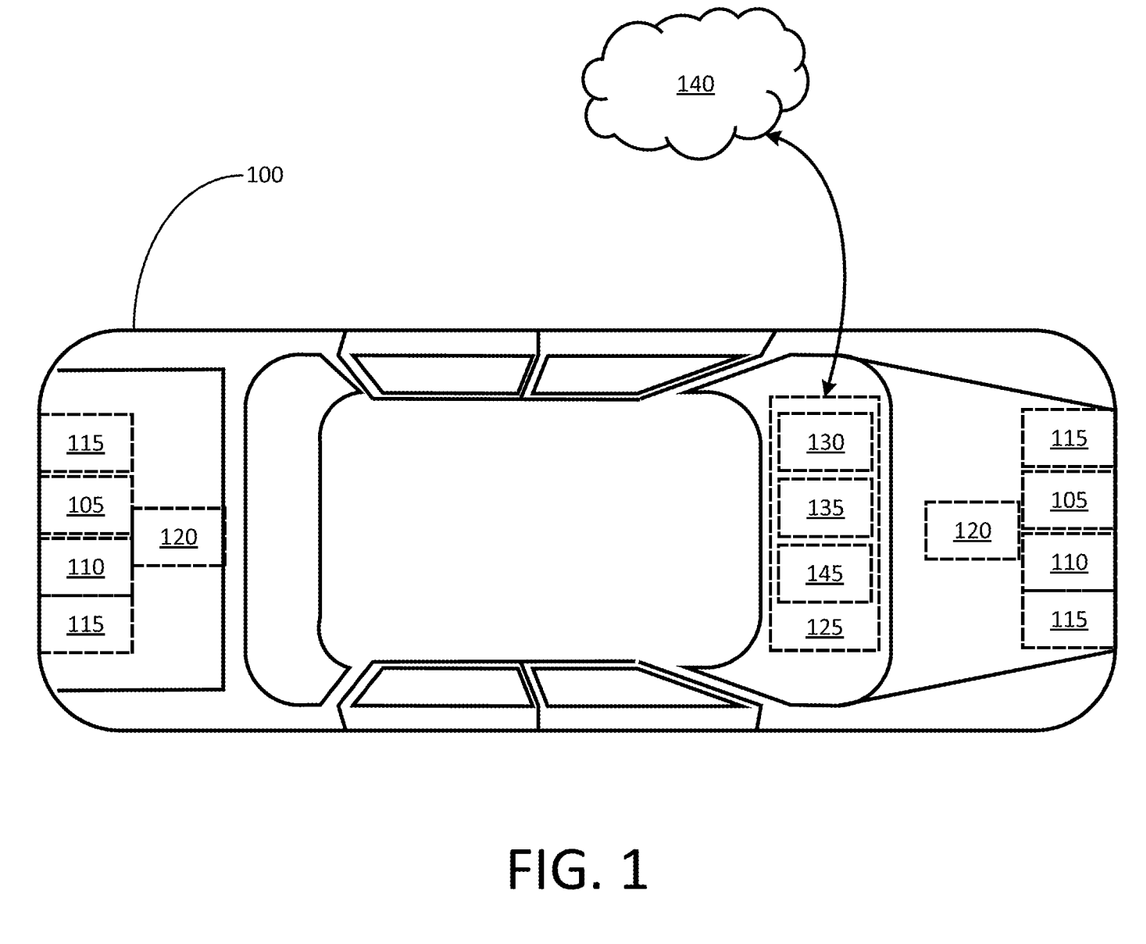
FIG. 1 illustrates a vehicle for performing shift characterization based on monitoring external sensory inputs and driving conditions, according to an exemplary embodiment of the present disclosure.

Referring now to FIG. 1, a vehicle 100 for performing shift characterization based on monitoring external sensory inputs and driving conditions is illustratively depicted, in accordance with an exemplary embodiment of the present disclosure.

The vehicle 100 may be an autonomous vehicle, a semi-autonomous vehicle, and/or other suitable vehicle. According to an exemplary embodiment, the vehicle 100 may comprise one or more sensors such as, for example, one or more LiDAR sensors 105, one or more radio detection and ranging (radar) sensors 110, one or more cameras 115, and/or one or more position determining sensors 120 (e.g., one or more Global Positioning System devices), among other suitable sensors. According to an exemplary embodiment, the one or more sensors may be in electronic communication with one or more computing devices 125. The one or more computing devices 125 may be separate from the one or more sensors and/or may be incorporated into the one or more sensors.

According to an exemplary embodiment, the vehicle 100 and/or one or more computing devices 125 may comprise one or more transceivers 145 configured to send and/or receive digital information through, e.g., the cloud 140.

Figure 2:
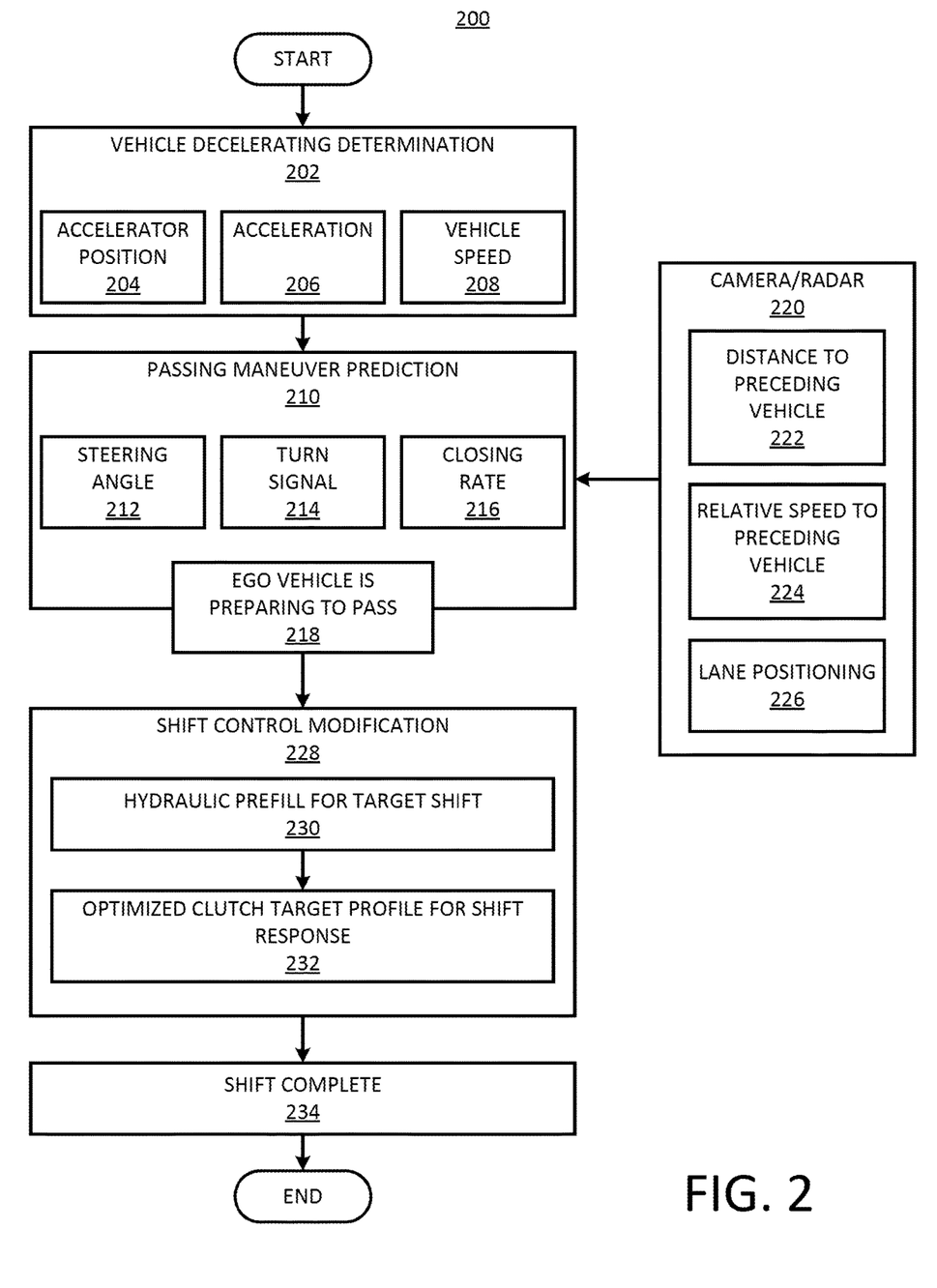
FIG. 2 illustrates control logic for performing shift characterization based on monitoring external sensory inputs and driving conditions, according to an exemplary embodiment of the present disclosure.

Referring now to FIG. 2, control logic 200 for performing shift characterization based on monitoring external sensory inputs and driving conditions is illustratively depicted, in accordance with an exemplary embodiment of the present disclosure.

According to an exemplary embodiment, the control logic 200 may be configured to monitor, for a vehicle (e.g., vehicle 100), both driver input and driving situations via a sensor unit (e.g., a frontal camera/radar unit 220). The frontal camera/radar unit 220 may comprise one or more cameras (e.g., camera(s) 115) and one or more radar sensors (e.g., radar sensor(s) 110). The frontal camera/radar unit 220 may be configured to determine a distance between an ego vehicle (i.e., the vehicle housing the camera/radar unit 220 such as, e.g., vehicle 100) and a preceding vehicle 222, a relative speed to the preceding vehicle 224 (e.g., a relative speed between the ego vehicle and the preceding vehicle), lane positioning 226 (e.g., the position of one or more lanes in relation to the ego vehicle), and/or other suitable measurements.

According to an exemplary embodiment, the camera/radar unit 220 may be configured to determine if a driver is entering into a passing maneuver to apply more aggressive shift control to give the driver faster shift response and reduce hesitation feeling. Since there is usually some trade-off between refinement and response in shift control, a method to apply more aggressive shift control, when it is the driver's intention to request more immediate response, is necessary.

According to an exemplary embodiment, a primary driving situation that is being targeted may be when the ego vehicle comes up behind a slower preceding vehicle and is forced to decelerate to maintain headway distance. The ego vehicle may then intend to move to an adjacent lane, downshift, and accelerate past the preceding vehicle, defined as a "passing maneuver."

Vehicle response is a high priority for the driver during a passing maneuver. Therefore, modification of shift control to provide a quicker, more aggressive shift will help improve "perception of power." Shift refinement and response may be trade-offs. Therefore, applying this logic when the driver is more likely to need a higher level of response may make the loss of refinement more acceptable.

According to an exemplary embodiment, the control logic 200 may comprise a vehicle deceleration determination section 202. In the vehicle deceleration determination section 202, accelerator position 204, vehicle control and motion status measurements such as, e.g., vehicle acceleration 206, vehicle speed 208, and/or other suitable vehicle control and motion status measurements may be incorporated to determine if the vehicle (e.g., vehicle 100) is entering into deceleration above a speed threshold. According to an exemplary embodiment, the vehicle control and motion status measurements may be input from a driver.

According to an exemplary embodiment, the control logic 200 may comprise a passing maneuver prediction section 210. The passing maneuver prediction section 210 may receive one or more inputs from the camera/radar unit 220. The passing maneuver prediction section 210 may be configured to analyze driving and/or road situations (e.g., steering angle 212, turn signal indication 214, relative velocity between the ego vehicle and the preceding vehicle 216, and/or one or more other suitable driving and/or road situations) in reference to the ego vehicle to determine if the vehicle is likely to enter into a passing situation (i.e., to determine whether the ego vehicle is preparing to pass 218).

According to an exemplary embodiment, the control logic 200 may comprise a shift control modification section 228. The shift control modification section 228 may be configured to prepare a shift for faster response by applying an hydraulic pre-fill strategy (e.g., determining an hydraulic refill for a target shift 230) and more aggressive clutch apply profile (e.g., determining an optimized clutch target profile for shift response 232), which prioritizes shift response.

According to an exemplary embodiment, after the shift control modification 228, the shift control may be completed 234.

Figure 3:
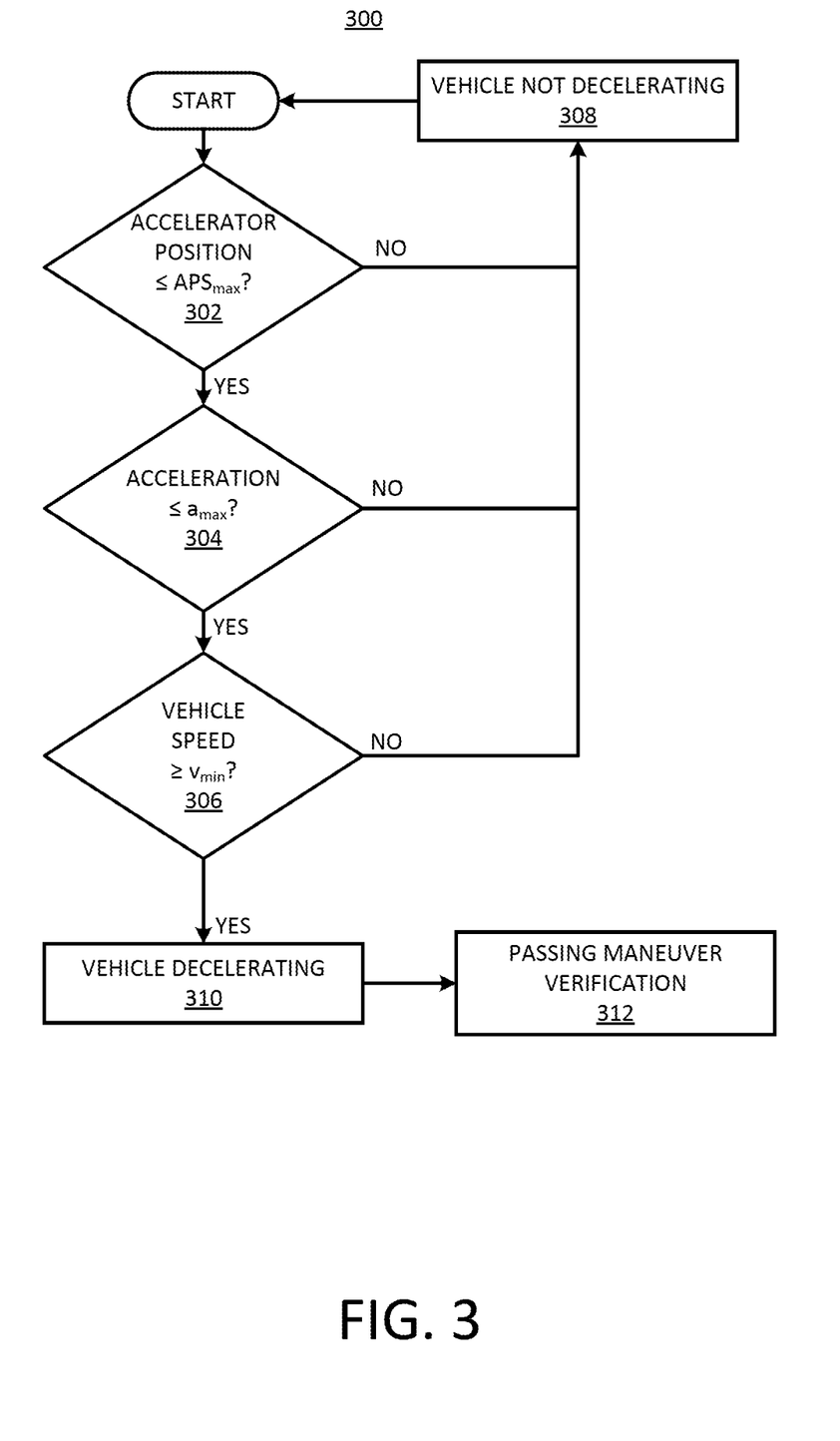
FIG. 3 illustrates a method of detecting vehicle deceleration, according to an exemplary embodiment of the present disclosure.

Referring now to FIG. 3, a method 300 of detecting vehicle deceleration is illustratively depicted, in accordance with an exemplary embodiment of the present disclosure.

According to an exemplary embodiment, method 300 is configured to determine if a vehicle (e.g., vehicle 100) is beginning to decelerate at a minimum rate. This may indicate a level of driver aggression, which may predicate preparation for a passing maneuver (e.g., passing maneuver prediction 210 of FIG. 2). To determine if the driver is intending to enter into a passing maneuver, one or more of the following driver inputs may be observed.

At 302, it may be determined whether an accelerator pedal position is less than or equal to a maximum accelerator pedal position, $APS_{max}$. The maximum accelerator pedal position, $APS_{max}$, may be predetermined. Accelerator input should be minimal as the ego vehicle should be decelerating behind preceding vehicle to maintain desired headway distance. According to an exemplary embodiment, accelerator pedal position may be calculated in terms of a percentage of a total change in accelerator pedal position that is possible.

When the accelerator pedal position is not less than or equal to the maximum accelerator pedal position, $APS_{max}$, it may be determined, at 308, that the vehicle is not decelerating.

When the accelerator pedal position is less than or equal to the maximum accelerator pedal position, $APS_{max}$, it may be determined, at 304, whether an acceleration of the ego vehicle is less than or equal to a maximum acceleration, $a_{max}$ (m/sec$^2$).

Acceleration above the maximum acceleration may indicate that the vehicle is not decelerating. When the acceleration is not less than or equal to a maximum acceleration, $a_{max}$, it may be determined, at 308, that the vehicle is not decelerating.

When the maximum acceleration is less than or equal to the maximum acceleration, $a_{max}$, it may be determined, at 306, whether a vehicle speed is greater than or equal to a minimum vehicle speed, $V_{min}$. According to an exemplary embodiment, passing maneuvers above a certain ego vehicle speed may be considered (e.g., highway speed). According to an exemplary embodiment, the minimum vehicle speed, $V_{min}$, may be predetermined.

When the vehicle speed is not greater than or equal to the minimum vehicle speed, $V_{min}$, it may be determined, at 308, that the vehicle is not decelerating.

When the vehicle speed is greater than or equal to the minimum vehicle speed, $V_{min}$, and when all driver input criteria are met, then, at 310, is may be determined that the vehicle is decelerating. It is noted that steps 302, 304, and 306 are given by way of example and may be performed in any order and/or with greater or fewer steps.

After it is determined, at 310, that the vehicle is decelerating, then, at 312, passing maneuver prediction logic may be implemented to verify an intention of the vehicle to perform a passing maneuver. According to an exemplary embodiment, one or more camera/radar unit 220 signals may be incorporated in verifying the intention of the vehicle to perform a passing maneuver.

Figure 4:
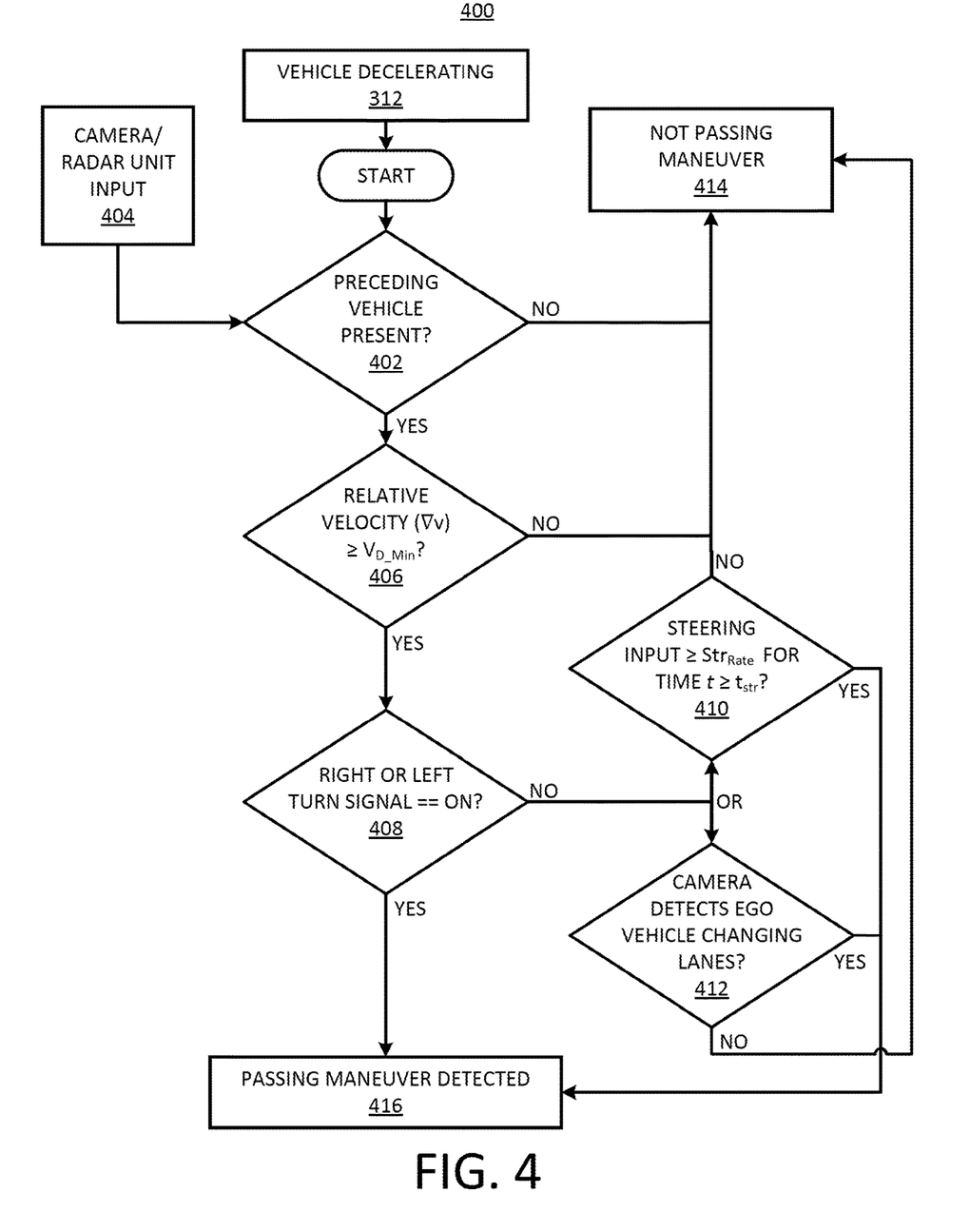
FIG. 4 illustrates a method of predicting passing maneuvers is illustratively depicted, in accordance with an exemplary embodiment of the present disclosure.

Referring now to FIG. 4, a method 400 of predicting passing maneuvers is illustratively depicted, in accordance with an exemplary embodiment of the present disclosure.

The method 400 may be configured to output a determination of whether a passing maneuver is occurring in order to trigger shift control logic to change to a more responsive characterization. According to an exemplary embodiment, to infer if a driver is able to begin a passing maneuver which would benefit from a shift control change, camera/radar unit 220 data and steering input data may be monitored.

According to an exemplary embodiment, once the ego vehicle has been detected to be decelerating at a specific rate, at 312, a presence of a preceding vehicle may be determined, at 402, which may confirm if the driver is decelerating due to a slower preceding vehicle. According to an exemplary embodiment, camera/radar unit 220 data may be input, at 404, to use in the determination of whether a preceding vehicle is present. One or more front facing cameras and/or one or more front radar signals may be used to confirm the presence of the preceding vehicle as well as the relative speed between the ego vehicle and the preceding vehicle. The relative speed may also be an indicator of if the ego vehicle was closing the headway distance aggressively or not.

When a preceding vehicle is not present, then, at 414, it is determined that the ego vehicle is not performing a passing maneuver.

When a preceding vehicle is present, then, at 406, it is determined whether a relative velocity, $\nabla v$ (m/s), between the ego vehicle and the preceding vehicle is greater than or equal to a minimum relative velocity, $V_{D\_Min}$, between the ego vehicle and the preceding vehicle.

When the relative velocity, $\nabla v$ (m/s), between the ego vehicle and the preceding vehicle is not greater than or equal to a minimum relative velocity, $V_{D\_Min}$, then, at 414, it is determined that the ego vehicle is not performing a passing maneuver.

When the relative velocity, $\nabla v$ (m/s), between the ego vehicle and the preceding vehicle is greater than or equal to a minimum relative velocity, $V_{D\_Min}$, then, at 408, it is determined whether a right or left turn signal has an on value (i.e., is activated). According to an exemplary embodiment, the turn signal status may be used as a robust indication that the driver intends to pass. If either of the right or left turn signals are activated then, at 416, a passing maneuver is detected and shift control modification may proceed.

When neither the right nor left turn signal has an on value (i.e., neither turn signal is activated), then an intention to enter the adjacent lane may be determined by steering angle turn rate or lane trajectory determination through the frontal camera.

Pertaining to the steering angle turn rate, at 410, it may be determined whether an input steering angle turn rate, $Str_{Rate}$ (deg/sec), is greater than or equal to a steering angle turn rate (deg/sec) for a time duration, t, greater than or equal to a time duration for a steering rate check, $t_{str}$. When the input steering angle turn rate, $Str_{Rate}$ (deg/sec), is not greater than the steering angle turn rate (deg/sec) for a time duration, t, greater than or equal to a time duration for a steering rate check, $t_{str}$, then, at 414, it is determined that the ego vehicle is not performing a passing maneuver. When the input steering angle turn rate, $Str_{Rate}$ (deg/sec), is greater than the steering angle turn rate (deg/sec) for a time duration, t, greater than or equal to a time duration for a steering rate check, $t_{str}$, then, at 416, a passing maneuver is detected and shift control modification may proceed.

Pertaining to the lane trajectory determination, at 412, it may be determined whether the frontal camera detects the ego camera changing lanes. When the frontal camera does not detect the ego vehicle changing lanes, then, at 414, it is determined that the ego vehicle is not performing a passing maneuver. When the frontal camera does detect the ego vehicle changing lanes, then, at 416, a passing maneuver is detected and shift control modification may proceed.

Figure 5:
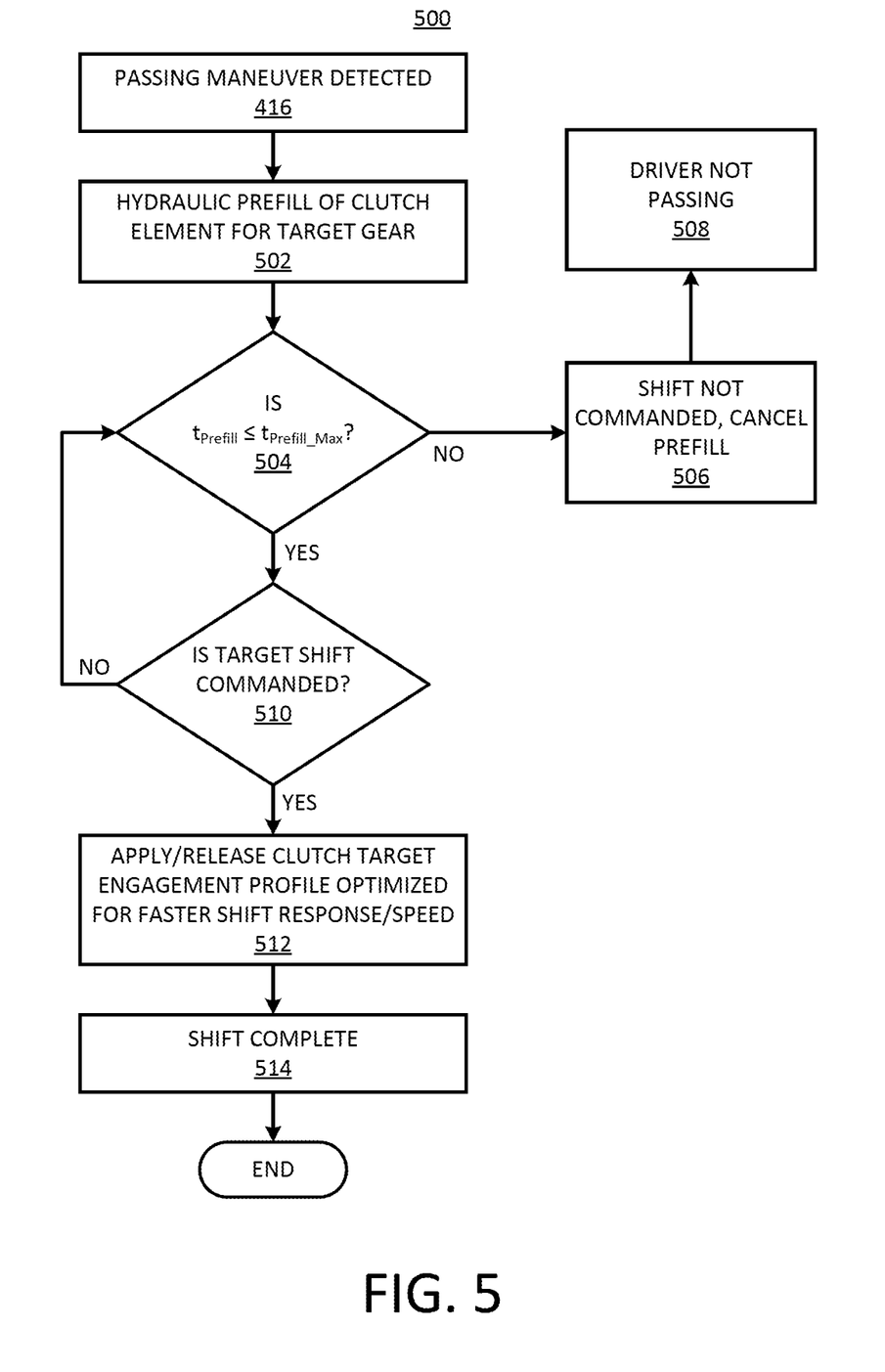
FIG. 5 illustrates a method for applying modified shift control, according to an exemplary embodiment of the present disclosure.

Referring now to FIG. 5, a method 500 for applying modified shift control is illustratively depicted, in accordance with an exemplary embodiment of the present disclosure.

According to an exemplary embodiment, once a passing maneuver, at 416, is detected, shift control may be modified for a better response.

According to an exemplary embodiment, response improvements may comprise, at 502, performing hydraulic prefill, in which the hydraulic fill control is preformed prior to the shift being commanded in order to fill an empty volume of a shifting element (e.g., clutch, brake, etc.) of an automatic transmission to reduce shifting delay by enabling a clutch pack to achieve torque transfer quicker. According to an exemplary embodiment, once the passing maneuver has been detected with sufficient certainty, prefilling of the apply clutch elements for the target shift may begin prior to the driver commanding a downshift, and starting the shift.

Reducing the duration of prefill is advantageous because it requires some amount of capacity from the oil pump to keep the clutch filled, therefore consuming energy. Combining prefill with a predictive strategy aids in reducing the overall duration of prefill while still benefiting from the effect. According to an exemplary embodiment, it is determined, at 504, whether a time since the hydraulic prefill was initiated, $t_{Prefill}$, is less than or equal to a maximum duration of the hydraulic prefill, $t_{Prefill\_Max}$.

When the time since the hydraulic prefill was initiated, $t_{Prefill}$, is not less than or equal to the maximum duration of the hydraulic prefill, $t_{Prefill\_Max}$, then, at 506, it is determined that the shift is not commanded and the prefill is cancelled, and it is also determined, at 508, that the driver is not passing.

When the time since the hydraulic prefill was initiated, $t_{Prefill}$, is less than or equal to the maximum duration of the hydraulic prefill, $t_{Prefill\_Max}$, then, at 510, it is determined whether the target shift is commanded. According to an exemplary embodiment, the hydraulic prefill may be enabled for a maximum duration of time to allow for cancellation if the driver does not command the downshift within a specified amount of time.

When it is determined that the target shift is not commanded, then it is determined, at 504, whether the time since the hydraulic prefill was initiated, $t_{Prefill}$, is less than or equal to the maximum duration of the hydraulic prefill, $t_{Prefill\_Max}$.

When it is determined that the target shift is commanded, then, at 512, target engagement profiles for an apply and release clutch may be optimized for quicker response, decreased shift time, etc. According to an exemplary embodiment, once the target shift has been commanded by the driver (e.g., through downshift), the modified clutch engagement profiles may be applied for more favorable shift response.

According to an exemplary embodiment, once target engagement profiles for the apply and release clutch are optimized, then, at 514, the shift is complete. According to an exemplary embodiment, once the shift completes, the logic may reset to continue monitoring for passing maneuver behavior.

Figure 6:
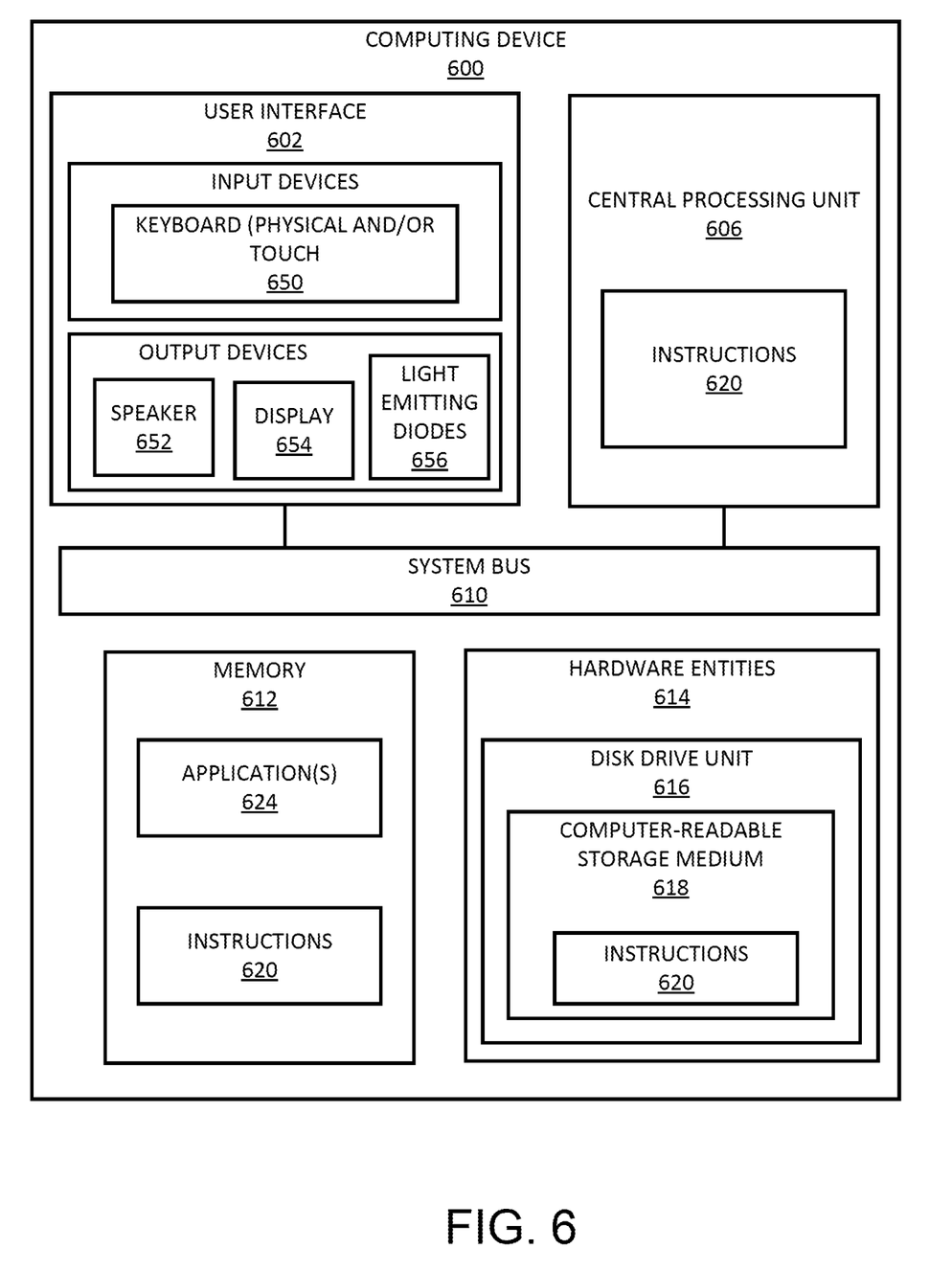
FIG. 6 illustrates example elements of a computing device, according to an exemplary embodiment of the present disclosure.

Referring now to FIG. 6, an illustration of an example architecture for a computing device 600 is provided. According to an exemplary embodiment, one or more functions of the present disclosure may be implemented by a computing device such as, e.g., computing device 600 or a computing device similar to computing device 600. The computing device 125 of FIG. 1 may be the same as or similar to computing device 600. As such, the discussion of computing device 600 is sufficient for understanding the computing device 125 of FIG. 1, for example.

The hardware architecture of FIG. 6 represents one example implementation of a representative computing device configured to perform one or more methods and means for shift characterization based on monitoring external sensory inputs and driving conditions to influence various shift control parameters to optimize passing situations, as described herein. As such, the computing device 600 of FIG. 6 may be configured to implement at least a portion of the systems (e.g., vehicle 100 of FIG. 1), control logic (e.g., control logic 200 of FIG. 2), and/or method(s) described herein (e.g., methods 300 of FIG. 3, 400 of FIG. 4, and 500 of FIG. 5).

Some or all components of the computing device 600 may be implemented as hardware, software, and/or a combination of hardware and software. The hardware may comprise, but is not limited to, one or more electronic circuits. The electronic circuits may comprise, but are not limited to, passive components (e.g., resistors and capacitors) and/or active components (e.g., amplifiers and/or microprocessors). The passive and/or active components may be adapted to, arranged to, and/or programmed to perform one or more of the methodologies, procedures, or functions described herein.

As shown in FIG. 6, the computing device 600 may comprise a user interface 602, a Central Processing Unit ("CPU") 606, a system bus 610, a memory 612 connected to and accessible by other portions of computing device 600 through system bus 610, and hardware entities 614 connected to system bus 610. The user interface may comprise input devices and output devices, which may be configured to facilitate user-software interactions for controlling operations of the computing device 600. The input devices may comprise, but are not limited to, a physical and/or touch keyboard 640. The input devices may be connected to the computing device 600 via a wired or wireless connection (e.g., a Bluetooth® connection). The output devices may comprise, but are not limited to, a speaker 642, a display 644, and/or light emitting diodes 646.

At least some of the hardware entities 614 may be configured to perform actions involving access to and use of memory 612, which may be a Random Access Memory (RAM), a disk driver and/or a Compact Disc Read Only Memory (CD-ROM), among other suitable memory types. Hardware entities 614 may comprise a disk drive unit 616 comprising a computer-readable storage medium 618 on which may be stored one or more sets of instructions 620 (e.g., programming instructions such as, but not limited to, software code) configured to implement one or more of the methodologies, procedures, or functions described herein. The instructions 620 may also reside, completely or at least partially, within the memory 612 and/or within the CPU 606 during execution thereof by the computing device 600.

The memory 612 and the CPU 606 may also constitute machine-readable media. The term "machine-readable media", as used here, refers to a single medium or multiple media (e.g., a centralized or distributed database, and/or associated caches and servers) that store the one or more sets of instructions 620. The term "machine-readable media", as used here, also refers to any medium that is capable of storing, encoding, or carrying a set of instructions 620 for execution by the computing device 600 and that cause the computing device 600 to perform any one or more of the methodologies of the present disclosure.

Figure 7:
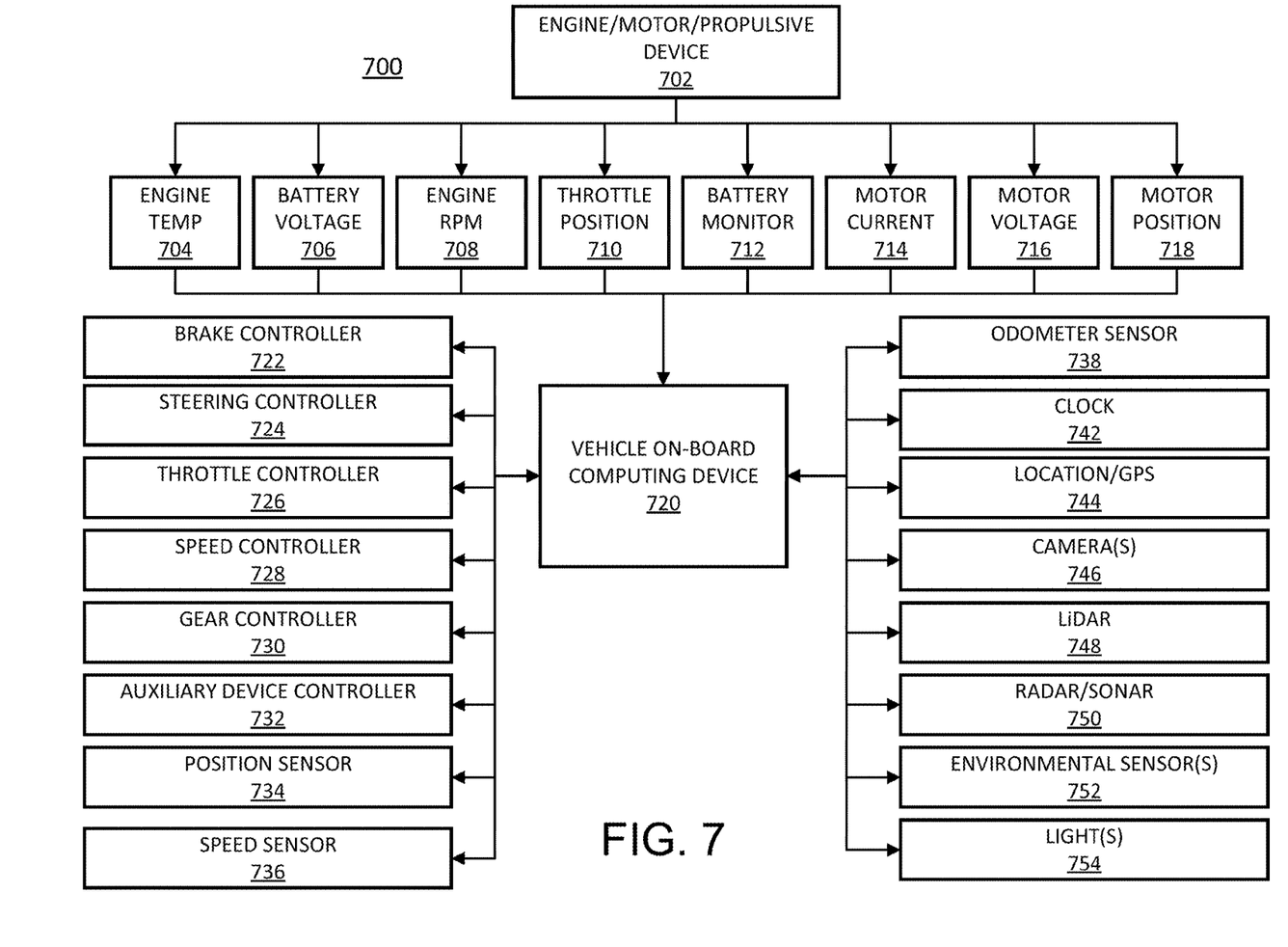
FIG. 7 illustrates an example architecture of a vehicle, according to an exemplary embodiment of the present disclosure.

Referring now to FIG. 7, an example vehicle system architecture 700 for a vehicle is provided, in accordance with an exemplary embodiment of the present disclosure.

Vehicle 100 may be configured to be incorporated in or with a vehicle having the same or similar system architecture as that shown in FIG. 7. Thus, the following discussion of vehicle system architecture 700 is sufficient for understanding one or more components of vehicle 100.

As shown in FIG. 7, the vehicle system architecture 700 may comprise an engine, motor or propulsive device (e.g., a thruster) 702 and various sensors 704-718 for measuring various parameters of the vehicle system architecture 700. In gas-powered or hybrid vehicles having a fuel-powered engine, the sensors 704-718 may comprise, for example, an engine temperature sensor 704, a battery voltage sensor 706, an engine Rotations Per Minute (RPM) sensor 708, and/or a throttle position sensor 710, and a cam position sensor 711. If the vehicle is an electric or hybrid vehicle, then the vehicle may comprise an electric motor, and accordingly may comprise sensors such as a battery monitoring system 712 (to measure current, voltage and/or temperature of the battery), motor current 714 and voltage 716 sensors, and motor position sensors such as resolvers and encoders 718.

Operational parameter sensors that are common to both types of vehicles may comprise, for example: a position sensor 734 such as an accelerometer, gyroscope and/or inertial measurement unit; a speed sensor 736; and/or an odometer sensor 738. The vehicle system architecture 700 also may comprise a clock 742 that the system uses to determine vehicle time and/or date during operation. The clock 742 may be encoded into the vehicle on-board computing device 720, it may be a separate device, or multiple clocks may be available.

The vehicle system architecture 700 also may comprise various sensors that operate to gather information about the environment in which the vehicle is traveling. These sensors may comprise, for example: a location sensor 744 (for example, a Global Positioning System (GPS) device); object detection sensors such as one or more cameras 746; a LiDAR sensor system 748; and/or a RADAR and/or a sonar system 750. The sensors also may comprise environmental sensors 752 such as, e.g., a humidity sensor, a precipitation sensor, a light sensor, and/or ambient temperature sensor. The object detection sensors may be configured to enable the vehicle system architecture 700 to detect objects that are within a given distance range of the vehicle in any direction, while the environmental sensors 752 may be configured to collect data about environmental conditions within the vehicle's area of travel. According to an exemplary embodiment, the vehicle system architecture 700 may comprise one or more lights 754 (e.g., headlights, flood lights, flashlights, etc.).

During operations, information may be communicated from the sensors to an on-board computing device 720 (e.g., computing device 125 of FIG. 1 and computing device 700 of FIG. 7). The on-board computing device 720 may be configured to analyze the data captured by the sensors and/or data received from data providers and may be configured to optionally control operations of the vehicle system architecture 700 based on results of the analysis. For example, the on-board computing device 720 may be configured to control: braking via a brake controller 722; direction via a steering controller 724; speed and acceleration via a throttle controller 726 (in a gas-powered vehicle) or a motor speed controller 728 (such as a current level controller in an electric vehicle); a differential gear controller 730 (in vehicles with transmissions); and/or other controllers. The brake controller 722 may comprise a pedal effort sensor, pedal effort sensor, and/or simulator temperature sensor, as described herein.

Geographic location information may be communicated from the location sensor 744 to the on-board computing device 720, which may then access a map of the environment that corresponds to the location information to determine known fixed features of the environment such as streets, buildings, stop signs and/or stop/go signals. Captured images from the cameras 746 and/or object detection information captured from sensors such as LiDAR 748 may be communicated from those sensors to the on-board computing device 720. The object detection information and/or captured images may be processed by the on-board computing device 720 to detect objects in proximity to the vehicle. Any known or to be known technique for making an object detection based on sensor data and/or captured images may be used in the embodiments disclosed in this document.

What has been described above includes examples of the subject disclosure. It is, of course, not possible to describe every conceivable combination of components or methodologies for purposes of describing the subject matter, but it is to be appreciated that many further combinations and permutations of the subject disclosure are possible. Accordingly, the claimed subject matter is intended to embrace all such alterations, modifications, and variations that fall within the spirit and scope of the appended claims.

In particular and in regard to the various functions performed by the above described components, devices, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter.

The aforementioned systems and components have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components. Any components described herein may also interact with one or more other components not specifically described herein.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

Thus, the embodiments and examples set forth herein were presented in order to best explain various selected embodiments of the present invention and its particular application and to thereby enable those skilled in the art to make and use embodiments of the invention. However, those skilled in the art will recognize that the foregoing description and examples have been presented for the purposes of illustration and example only. The description as set forth is not intended to be exhaustive or to limit the embodiments of the invention to the precise form disclosed.

What is claimed is:

1. A method for performing shift characterization, comprising:
   determining whether an ego vehicle is decelerating based on one or more vehicle control and motion status measurements;
   monitoring, using a sensor unit, driver input and one or more driving situations for the ego vehicle;
   when the ego vehicle is decelerating, determining, using a processor and based on the driver input and the one or more driving situations for the ego vehicle from the sensor unit, whether the ego vehicle is entering into a passing maneuver; and
   when it is determined that the ego vehicle is entering into the passing maneuver, performing a shift control modification of the ego vehicle,
   wherein the determining whether the ego vehicle is entering into the passing maneuver comprises:
      determining whether a preceding vehicle is present,
      when the preceding vehicle is not present, determining that the ego vehicle is not entering into the passing maneuver;
      when the preceding vehicle is present, determining whether a right or left turn signal has an on value; and
      when the right or left turn signal does not have an on value:
         determining whether an input steering angle turn rate of the ego vehicle is greater than or equal to a steering angle turn rate for a time duration greater than or equal to a time duration for a steering rate check, wherein, when the input steering angle turn rate of the ego vehicle is not greater than or equal to a steering angle turn rate for a time duration greater than or equal to a time duration for a steering rate check, determining that the ego vehicle is not entering into the passing maneuver; or
         determining whether a camera of the sensor unit detects that the ego vehicle is changing lanes, wherein, when the camera of the sensor unit does not detect that the ego vehicle is changing lanes, determining that the ego vehicle is not entering into the passing maneuver.

2. The method of claim 1, wherein the one or more vehicle control and motion status measurements comprise one or more of the following:
   an accelerator pedal position;
   a vehicle acceleration; and
   vehicle speed.

3. The method of claim 1, wherein the one or more driving situations comprises one or more of the following:
   a distance between the ego vehicle and a preceding vehicle;
   a relative speed between the ego vehicle and the preceding vehicle; and
   a position of one or more lanes in relation to the ego vehicle.

4. The method of claim 1, wherein the determining whether the ego vehicle is decelerating comprises one or more of the following:
   determining whether an accelerator pedal position of the ego vehicle is less than or equal to a maximum accelerator pedal position,
      wherein, when the accelerator pedal position is not less than or equal to the maximum accelerator pedal position, it is determined that the ego vehicle is not decelerating;
   determining whether an acceleration of the ego vehicle is less than or equal to a maximum acceleration,
      wherein, when the acceleration of the ego vehicle is not less than or equal to the maximum acceleration, it is determined that the ego vehicle is not decelerating; and
   determining whether a vehicle speed of the ego vehicle is greater than or equal to a minimum vehicle speed,
      wherein, when the vehicle speed of the ego vehicle is not greater than or equal to the minimum vehicle speed, it is determined that the ego vehicle is not decelerating.

5. The method of claim 1, wherein the determining whether the ego vehicle is entering into the passing maneuver comprises determining one or more driving situations, wherein the one or more driving situations comprises one or more of the following:
   a steering angle of the ego vehicle;
   a turn signal indication of the ego vehicle; and
   a relative velocity between the ego vehicle and a preceding vehicle.

6. The method of claim 1, wherein the determining whether the ego vehicle is entering into the passing maneuver comprises:
   when the preceding vehicle is present, determining whether a relative velocity between the ego vehicle and the preceding vehicle is greater than or equal to a minimum relative velocity between the ego vehicle and the preceding vehicle,
      wherein, when the relative velocity between the ego vehicle and the preceding vehicle is not greater than or equal to the minimum relative velocity between the ego vehicle and the preceding vehicle, it is determined that the ego vehicle is not entering into the passing maneuver.

7. A method for performing shift characterization, comprising:
   determining whether an ego vehicle is decelerating based on one or more vehicle control and motion status measurements;
   monitoring, using a sensor unit, driver input and one or more driving situations for the ego vehicle;
   when the ego vehicle is decelerating, determining, using a processor and based on the driver input and the one or more driving situations for the ego vehicle from the sensor unit, whether the ego vehicle is entering into a passing maneuver; and
   when it is determined that the ego vehicle is entering into the passing maneuver, performing a shift control modification of the ego vehicle;
   wherein the performing the shift control modification of the ego vehicle comprises performing a hydraulic prefill of a shifting element of the ego vehicle.

8. The method of claim 7, wherein the performing the shift control modification of the ego vehicle comprises:
   determining whether a time since the hydraulic prefill was initiated is less than or equal to a maximum duration of the hydraulic prefill; and
   when the time since the hydraulic prefill was initiated is not less than or equal to the maximum duration of the hydraulic prefill, cancelling the hydraulic prefill, wherein, when the time since the hydraulic prefill was initiated is not less than or equal to the maximum duration of the hydraulic prefill:
    it is determined that a driver of the ego vehicle does not command a target shift of the ego vehicle; and
    it is determined that the ego vehicle is not entering into the passing maneuver.

9. A system for performing shift characterization, comprising:
    an ego vehicle comprising:
        a sensor unit configured to monitor driver input and one or more driving situations for the ego vehicle; and
        a computing device comprising a processor and a memory, wherein the processor is configured to:
            determine whether an ego vehicle is decelerating based on one or more vehicle control and motion status measurements;
            when the ego vehicle is decelerating, determine, based on the driver input and the one or more driving situations for the ego vehicle from the sensor unit, whether the ego vehicle is entering into a passing maneuver; and
            when it is determined that the ego vehicle is entering into the passing maneuver, perform a shift control modification of the ego vehicle;
            wherein the performing the shift control modification of the ego vehicle comprises performing, by the processor, a hydraulic prefill of a shifting element of the ego vehicle.

10. The system of claim 9, wherein the one or more vehicle control and motion status measurements comprise one or more of the following:
    an accelerator pedal position;
    vehicle acceleration; and
    vehicle speed.

11. The system of claim 9, wherein the one or more driving situations comprises one or more of the following:
    a distance between the ego vehicle and a preceding vehicle;
    a relative speed between the ego vehicle and the preceding vehicle; and
    a position of one or more lanes in relation to the ego vehicle.

12. The system of claim 9, wherein the processor, in determining whether the ego vehicle is decelerating, is configured to:
    determine whether an accelerator pedal position of the ego vehicle is less than or equal to a maximum accelerator pedal position,
        wherein, when the accelerator pedal position is not less than or equal to the maximum accelerator pedal position, it is determined that the ego vehicle is not decelerating;
    determine whether an acceleration of the ego vehicle is less than or equal to a maximum acceleration,
        wherein, when the acceleration of the ego vehicle is not less than or equal to the maximum acceleration, it is determined that the ego vehicle is not decelerating; and/or
    determine whether a vehicle speed of the ego vehicle is greater than or equal to a minimum vehicle speed,
        wherein, when the vehicle speed of the ego vehicle is not greater than or equal to the minimum vehicle speed, it is determined that the ego vehicle is not decelerating.

13. The system of claim 9, wherein the sensor unit comprises at least one of the following:
    one or more cameras; and
    one or more radar sensors.

14. The system of claim 9, wherein the processor, in determining whether the ego vehicle is entering into the passing maneuver, is configured to determine one or more driving situations, wherein the one or more driving situations comprises one or more of the following:
    a steering angle of the ego vehicle;
    a turn signal indication of the ego vehicle; and
    a relative velocity between the ego vehicle and a preceding vehicle.

15. The system of claim 9, wherein the processor, in determining whether the ego vehicle is entering into the passing maneuver, is configured to:
    determine whether a preceding vehicle is present,
        wherein, when the preceding vehicle is not present, it is determined that the ego vehicle is not entering into the passing maneuver; and
    when the preceding vehicle is present, determine whether a relative velocity between the ego vehicle and the preceding vehicle is greater than or equal to a minimum relative velocity between the ego vehicle and the preceding vehicle,
        wherein, when the relative velocity between the ego vehicle and the preceding vehicle is not greater than or equal to the minimum relative velocity between the ego vehicle and the preceding vehicle, it is determined that the ego vehicle is not entering into the passing maneuver.

16. The system of claim 9, wherein the processor, in determining whether the ego vehicle is entering into the passing maneuver, is configured to:
    determine whether a preceding vehicle is present,
        wherein, when the preceding vehicle is not present, it is determined that the ego vehicle is not entering into the passing maneuver; and
    when the preceding vehicle is present, determine whether a relative velocity between the ego vehicle and the preceding vehicle is greater than or equal to a minimum relative velocity between the ego vehicle and the preceding vehicle,
        wherein, when the relative velocity between the ego vehicle and the preceding vehicle is not greater than or equal to the minimum relative velocity between the ego vehicle and the preceding vehicle, it is determined that the ego vehicle is not entering into the passing maneuver.

17. The system of claim 9, wherein the processor, in determining whether the ego vehicle is entering into the passing maneuver, is configured to:
    determine whether a preceding vehicle is present,
        wherein, when the preceding vehicle is not present, it is determined that the ego vehicle is not entering into the passing maneuver; and
    when the preceding vehicle is present, determine whether a right or left turn signal has an on value; and
    when the right or left turn signal does not have an on value:
        determine whether an input steering angle turn rate of the ego vehicle is greater than or equal to a steering angle turn rate for a time duration greater than or equal to a time duration for a steering rate check,
            wherein, when the input steering angle turn rate of the ego vehicle is not greater than or equal to a steering angle turn rate for a time duration greater than or equal to a time duration for a steering rate check, it is determined that the ego vehicle is not entering into the passing maneuver; or determine whether a camera of the sensor unit detects that the ego vehicle is changing lanes, wherein, when the camera of the sensor unit does not detect that the ego vehicle is changing lanes, it is determined that the ego vehicle is not entering into the passing maneuver.

18. The system of claim 9, wherein the processor, in performing the shift control modification of the ego vehicle, is configured to:

determine whether a time since the hydraulic prefill was initiated is less than or equal to a maximum duration of the hydraulic prefill; and when the time since the hydraulic prefill was initiated is not less than or equal to the maximum duration of the hydraulic prefill, cancel the hydraulic prefill, wherein, when the time since the hydraulic prefill was initiated is not less than or equal to the maximum duration of the hydraulic prefill:

it is determined that a driver of the ego vehicle does not command a target shift of the ego vehicle; and it is determined that the ego vehicle is not entering into the passing maneuver.

\* \* \* \* \*